April 15, 1958 W. C. HOLLANDER 2,830,619
PROTECTED VALVE SEAL
Filed Sept. 20, 1954 7 Sheets-Sheet 1

INVENTOR.
WALTER C. HOLLANDER
By his attorney
John F. C. Glenn

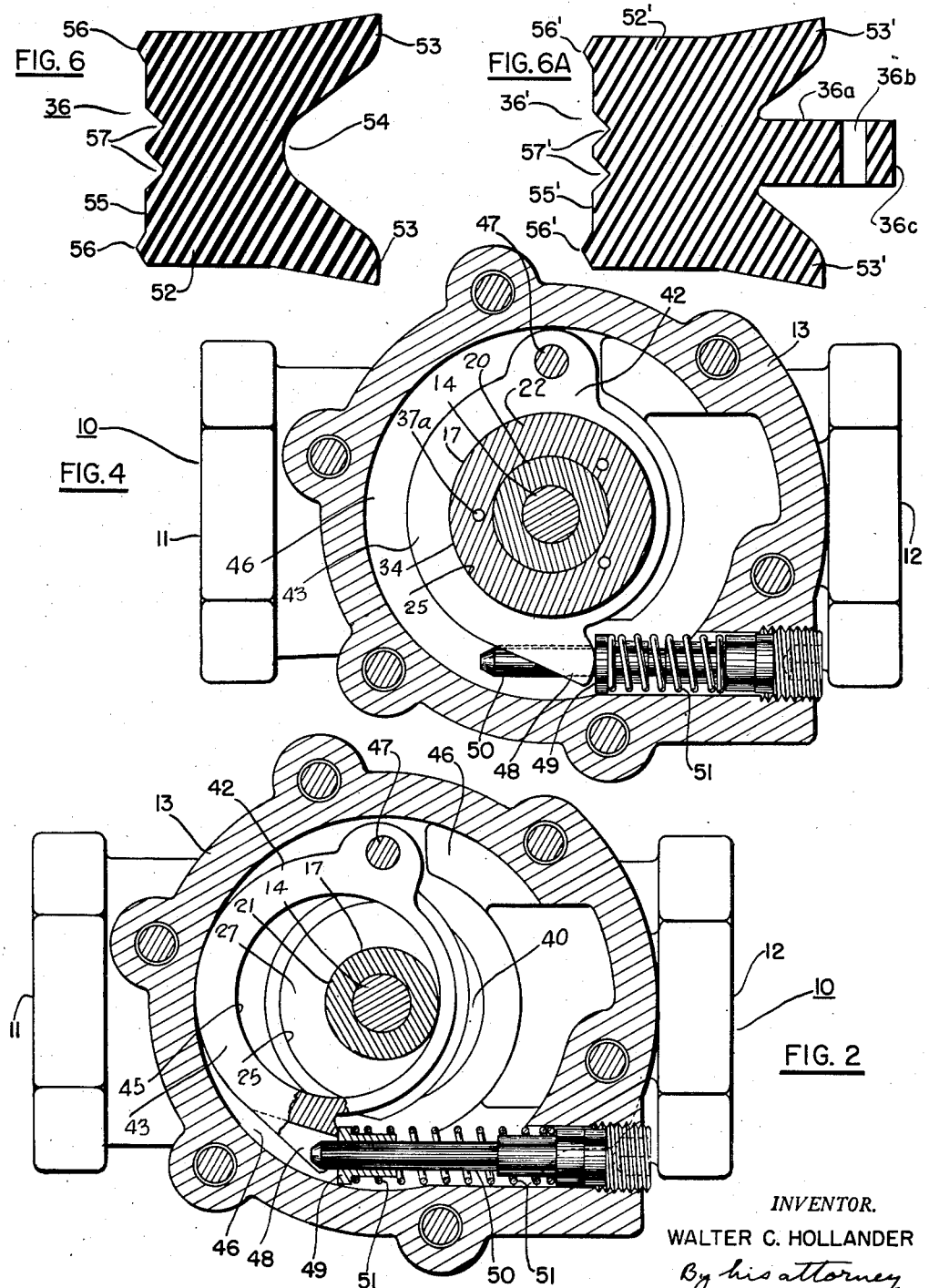

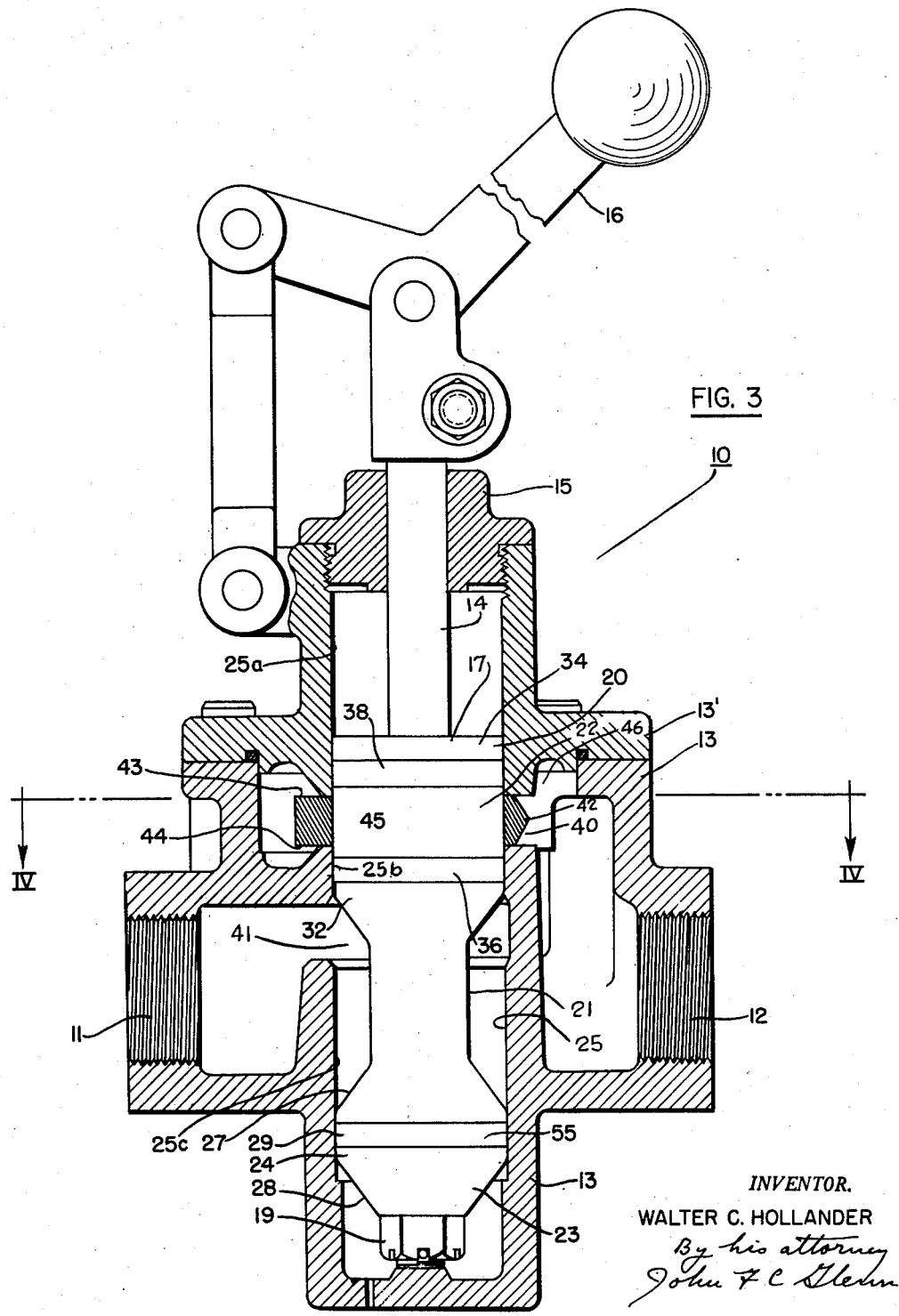

April 15, 1958 W. C. HOLLANDER 2,830,619
PROTECTED VALVE SEAL
Filed Sept. 20, 1954 7 Sheets-Sheet 4
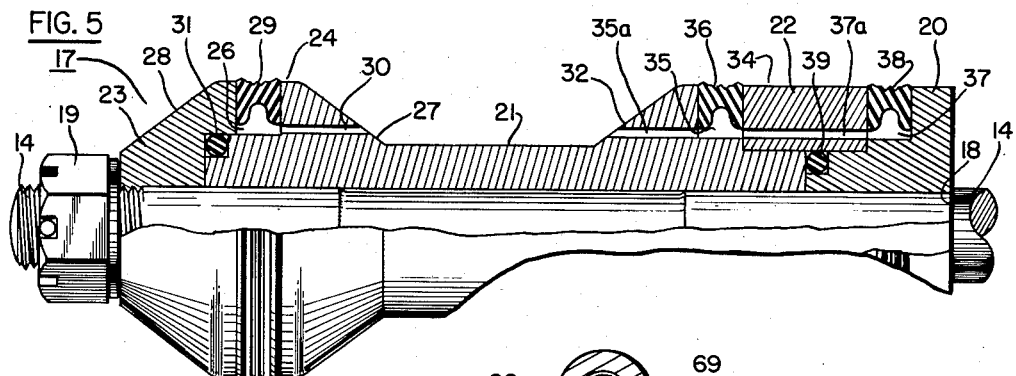
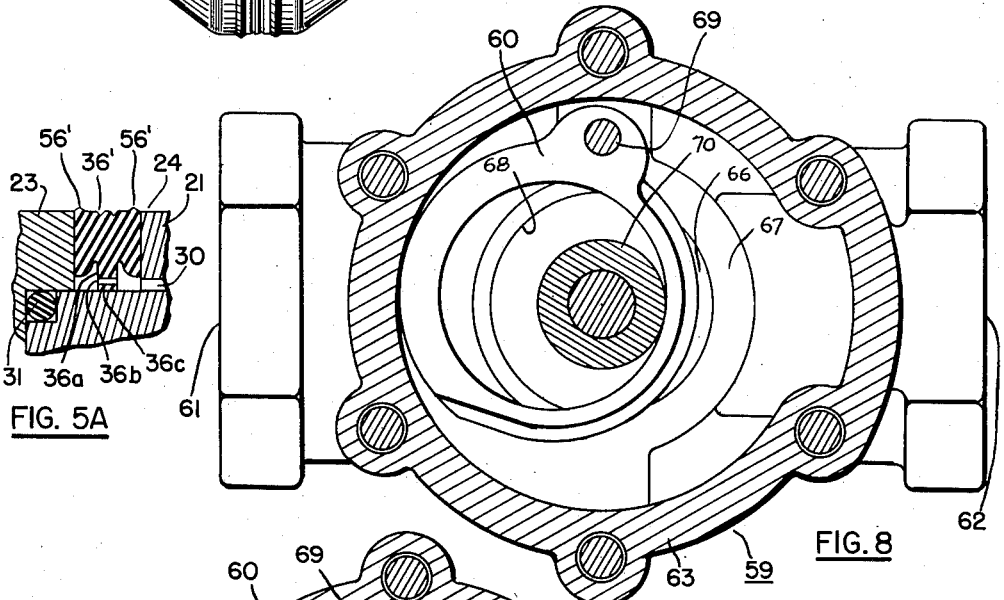
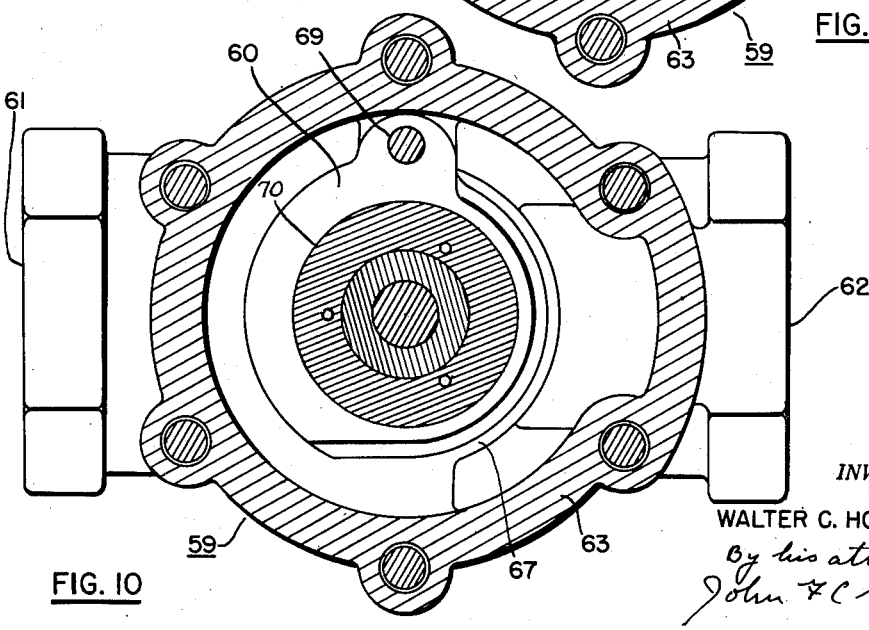
INVENTOR.
WALTER C. HOLLANDER
By his attorney
John F. C. Glenn April 15, 1958 W. C. HOLLANDER 2,830,619
PROTECTED VALVE SEAL Filed Sept. 20, 1954 7 Sheets-Sheet 5

INVENTOR.
WALTER C. HOLLANDER
By his attorney
John F C Glenn

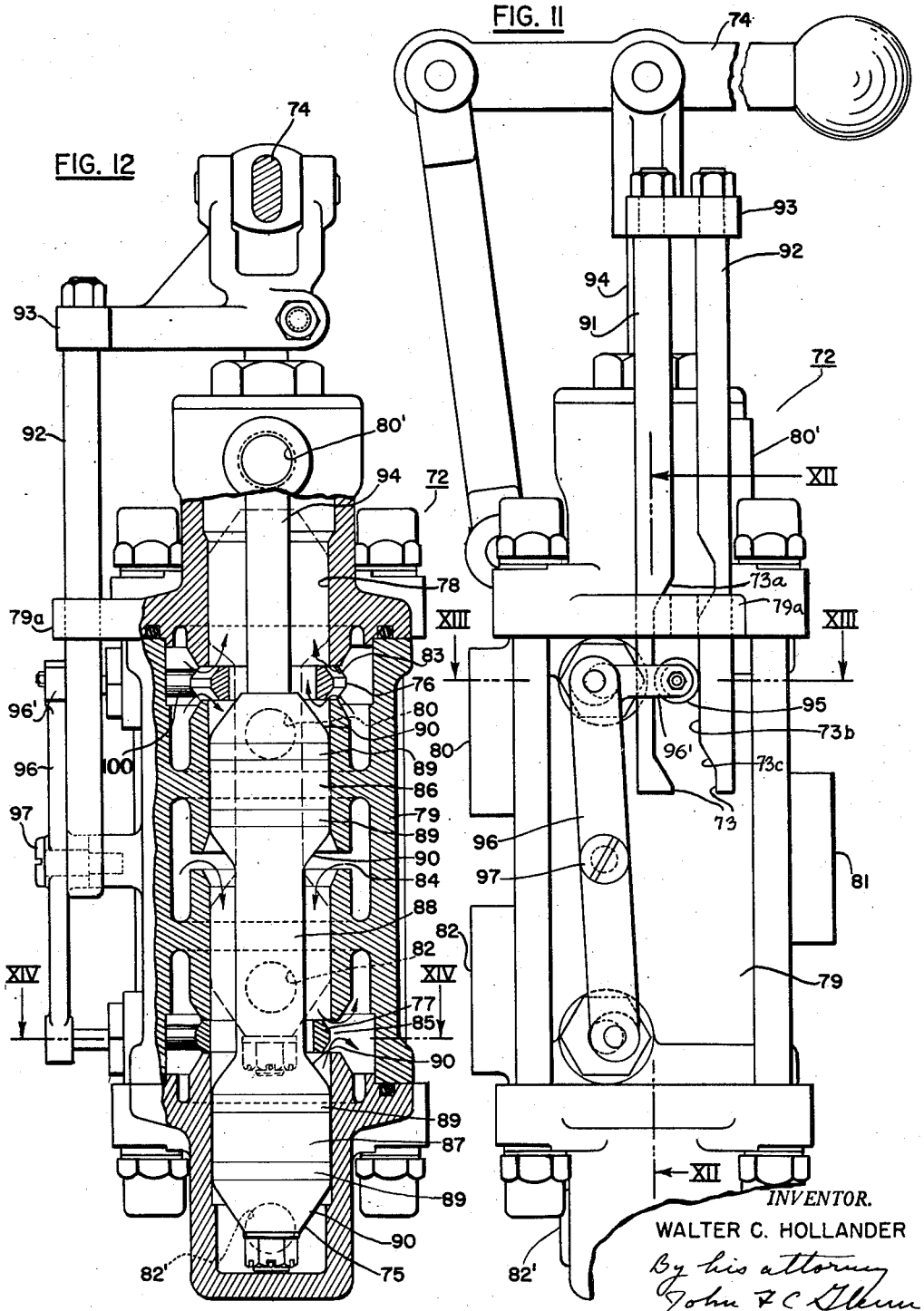

April 15, 1958   W. C. HOLLANDER   2,830,619
PROTECTED VALVE SEAL
Filed Sept. 20, 1954   7 Sheets-Sheet 7

INVENTOR.
WALTER C. HOLLANDER
By his attorney

United States Patent Office 2,830,619
Patented Apr. 15, 1958

2,830,619

PROTECTED VALVE SEAL

Walter C. Hollander, Buckingham County, Va.

Application September 20, 1954, Serial No. 457,183

16 Claims. (Cl. 137—622)

This invention relates to valves and means to seal fluid under pressure, and more particularly relates to annular packing elements around sliding spool valve elements and the like, and means to protect the packing elements.

Spool valves are widely used for controlling the supply of high pressure fluid for operating various machines, but have long presented a difficult problem of adequate sealing. Where leakage is not critical for the purpose, and relatively long working life of the valve between repairs is particularly desirable, it is conventional to use all-metal valves. In other cases, where valve leakage is critical, it is customary to insert rubber-like O-rings or other forms of packing around annular grooves in the sliding spool elements. This is effective in reducing leakage, but when the packing elements pass the shoulders of the valve seats formed in the valve casing, the relatively soft sealing elements are subjected to pinching action and as a result the operating life between repairs is relatively short. While the cost of the sealing elements is relatively slight, the time and trouble of frequent repairs is considerable, and the expense of shutting down the whole machine while the valve sealing elements are replaced can be very great. There has accordingly long been a need for some means of sealing spool valves effectively without shortening the working life of the sealing elements.

In accordance with the present invention the life of the spool sealing element is greatly extended by providing a shiftable protective element which moves into the valve port and provides a continuous smooth surface along which the sealing element may slide as the valve carries it past the port, and which moves out of the port to allow passage of fluid when the valve has opened the port. The protective member is preferably in the form of a ring having a cylindrical interior surface of the same diameter as the bore through which the spool slides in the valve casing, and of sufficient axial width to form an extension of the bore wall across the valve port. The protective member is shifted by means coordinated with the operation of the valve as a whole. The latter means may take various forms, relying, for example, on the action of fluid pressure, springs, means on the valve spool itself, and means operated by the valve spool shifting mechanism.

The protective member of the invention is useful in conjunction with conventional sealing elements, such as plain O-ring seals (e. g., Patent No. 1,385,019), and is especially useful in combination with improved sealing elements provided in accordance with the invention. Such sealing elements having a channeled cross-section and are mounted in a groove (such as a groove around the valve spool) with the open end of the channel facing the base of the groove, so that when fluid under pressure is supplied to the groove the sealing element is pressed out of the groove to force it into sealing engagement with some opposite surface (e. g., the bore in the valve casing). The sealing element may be of generally U-shaped cross-section with the closed end of the U having a generally rectangular shape, and with the open end of the U cross-section extending resiliently outwardly to provide an initial seal against the sides of the groove before pressure is applied to the fluid at the base of the groove. The bearing surface of the seal is preferably provided with small ridges adajacent its opposite side edges, to provide a quick seating seal, and with small grooves located between the ridges and filled with a semi-solid sealing lubricant. The U cross-section may be modified to a T cross-section, with the base of the T abutting the base of the groove and the head of the T tending to project at least slightly from the groove, in order to provide an initial sealing pressure before fluid in the base of the groove provides full sealing pressure, and in order to oppose buckling of the sealing element with consequent loss of effective sealing action.

Other objects, advantages and details of the invention will become apparent from the following detailed description of certain present preferred embodiments of the invention shown, for purposes of illustration only, in the accompanying drawings. In the drawings:

Figure 2 is an enlarged section on the line II—II in Figure 1;

Figure 3 is an enlarged sectional view corresponding to Figure 1, but with spool unsectioned and in its lower (closed) position;

Figure 4 is an enlarged section on the line IV—IV in Figure 3;

Figure 5 is a broken-away, enlarged, partially-sectioned view of the valve spool shown in Figures 1–4;

Figure 5A is a view corresponding to Figure 5, enlarged and broken away to show a modified form of sealing ring on the spool;

Figure 6 is an enlarge detailed view of the cross-section of one of the sealing rings shown in Figure 5;

Figure 6A is a view corresponding to Figure 6, showing the modified form of sealing ring shown in Figure 5A;

Figure 8 is an enlarged section on the line VIII—VIII in Figure 7;

Figure 10 is an enlarged section on the line X—X in Figure 9;

Figure 11 is a side view of a third form of valve embodying the invention, with the valve spool in middle position (all five ports closed);

Figure 12 is a section on the line XII—XII in Figure 11, but with the valve spool in its lower most position (lowermost port closed, two uppermost ports connected to each other, and two intermediate ports connected to each other);

Figure 1:
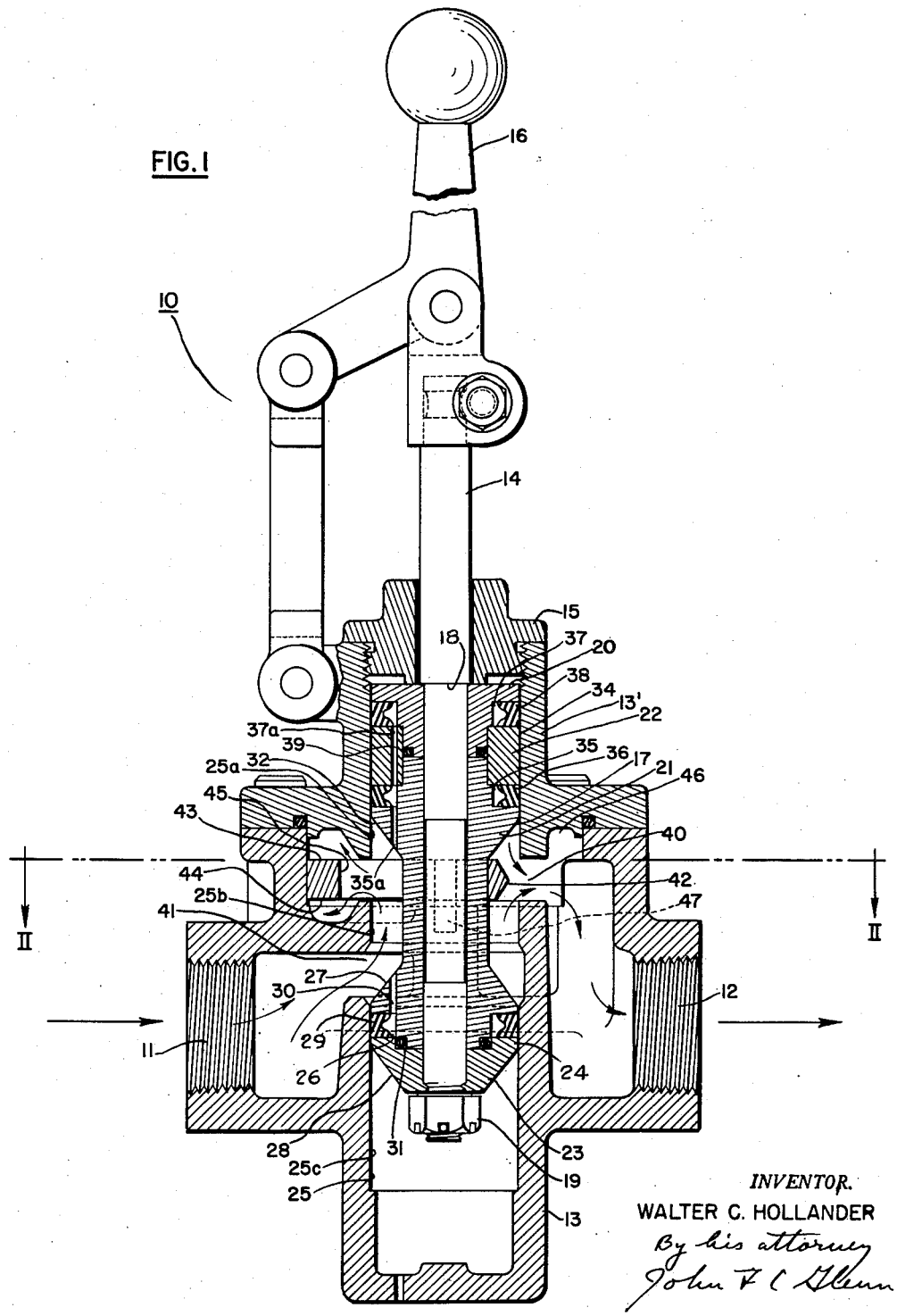
Figure 1 is a sectional view of a valve emboding the invention, with the valve spool in upper (open) position.
Figure 9:
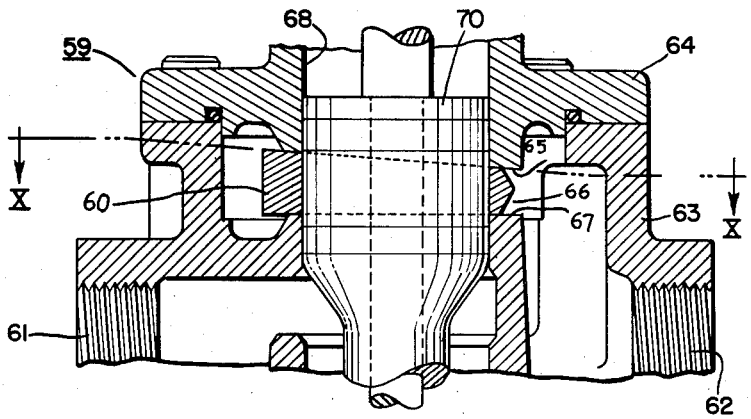
Figure 9 is a broken-away view corresponding to Figure 7, with the valve spool in its lower (closed) position.

Referring now more particularly to the drawings, and initially to Figures 1–5, the first embodiment of the invention is a valve 10 having reversible inlet and outlet ports 11 and 12 in a case 13. A valve stem 14 extends slidably through a stem-guide 15 which is screwed on a removable bonnet 13' forming part of a valve case 13. One end of the stem 14 projects outwardly from the case 13 and is connected to an operating handle 16 linked to the case 13. The other end of the stem 14 carries a spool 17 locked between a shoulder 18 formed on the stem 14 and a nut 19 screwed on the end of the stem 14. The metal components of the spool 17 consist of an upper end piece 20, a central sleeve 21, a ring 22, and a lower end-piece 23. The end-piece 20 and adjacent end of the sleeve 21 together form a lower annular valve flange 24 which is slidable along a bore 25 through the case 13, and which has an annular groove 26 therearound with opposite sidewalls lying in planes normal to the central axis of the stem 14. The flange 24 has a pair of opposite tapering shoulders 27 and 28 formed on the end-piece 23 and sleeve 21, respectively. An annular sealing ring 29 fits in the groove 26 and is urged radially outwardly by fluid under pressure fed to the groove 26 through a passage 30 extending through the shoulder 27. The ring 29 is preferably of rubberlike resilient material for most purposes (such as "neoprene"), but may be of a semi-pliable metallic composition or the like (such as a copper-lead or antimony-lead composition) where the valve is used to control high temperature fluids. A rubberlike O-ring seal 31 is mounted in a closed annular chamber between the end piece 20 and sleeve 21 to oppose escape of fluid therebetween from the groove 26 toward the stem 14. The sleeve 21 has an intermediate portion of reduced diameter, and increases in diameter along a sloping shoulder 32 adjacent its upper end. The sleeve 21, ring 22 and upper end-piece 20 together form an upper annular valve flange 34 which is slidable along the bore 25. The ring 22 and adjacent end of the sleeve 21 form a groove 35 with a sealing ring 36 mounted therein. The ring 22 and upper end piece 21 form a like groove 37 with a like sealing ring 38 mounted therein. At the juncture of the sleeve 21, ring 22 and end-piece 20 an O-ring 39 is mounted to oppose escape of fluid from the grooves 35 and 37 to the valve stem 14. A passage 35a extends through the shoulder 32 to the groove 35, and a passage 37a extends between grooves 35 and 37 through the ring 22, to supply fluid under pressure to urge the rings 36 and 38 radially outwardly from their grooves against the bore 25.

Upper and lower inner ports 40 and 41 open transversely into the bore 25, dividing it into an upper bore 25a, central bore 25b, and lower bore 25c. The inner port 40 is connected to the outer port 12 and is defined by a pair of opposite spaced plane surfaces normal to the axis of the stem 14 and making sharply defined corners where they intersect the bore 25. The lower inner port 41 is connected to the outer port 11 and is similarly defined, except that the corners are leveled at the intersection with the bore 25. When the valve is open, with spool 17 in its raised position (Figures 1 and 2), the flanges 24 and 34 are in the bores 25a and 25c, respectively, and fluid can pass freely from port 11 through port 41 into the annular space between bore 25b and the reduced portion of sleeve 21, and thence through port 40 to port 12 (or reverse). When the valve is closed, with spool 17 in its lowered position (Figures 3 and 4), flange 34 extends across port 40 with packing rings 36 and 38 in bores 25b and 25a, respectively, so that communication between ports 40 and 41 is blocked. In all operating positions of the valve the sealing rings 29 and 38 oppose escape of fluid past flanges 24 and 34, respectively, into the spaces beyond the ends of spool 17. Such spaces are vented to permit free movement of the spool between open and closed positions.

A protective ring 42 is mounted in the port 40 to prevent the sealing ring 36 from scraping against the sharp corners of port 40 during movement of spool 17 between open and closed positions. The ring 42 has parallel flat top and bottom surfaces 43 and 44 which are slidable between the opposed plane surfaces defining the port 40, and which make sharp annular corners where they intersect a cylindrical bore 45 through the ring 42 parallel to and of the same diameter as the bore 25. When the spool is in its lowered, closed position (Figures 3 and 4) the ring 42 extends slidably around flange 34 between packing rings 36 and 38, concentric with spool 17 and bore 25, so that as spool 17 is raised packing ring 36 will slide smoothly along the bores 25b and 45 into bore 25a, regardless of how much fluid pressure is supplied from ports 11 and 41 through passage 40 to urge packing ring 36 radially outwardly. As spool 17 approaches its raised, open position, ring 42 slides into an eccentric position (Figures 1 and 2) to allow passage of fluid through port 40 between its opening into bore 25 and an enlarged annular chamber 46 which extends around port 40 and connects it to outer port 12. During return movement of spool 17 the ring 42 returns to its concentric position and similarly protects the sealing ring 36 as it passes back across the port 40.

Spool shoulder 32 engages the upper inside edge of protective ring 42 and cams it from its eccentric position (Figures 1 and 2) to its concentric position (Figures 3 and 4) during movement of spool 17 from open to closed position. One side of ring 42 is journaled on a vertical pin 47 anchored at its lower end in the lower portion of case 13, and the other side of ring 42 has a lateral projection 48 which engages a collar 49 slidable along a horizontal pin 50 anchored in the lower portion of case 13. The projection 48 is bifurcated so that it overlaps but clears the pin 50. A spring 51 resiliently urges collar 49 against projection 48 to press ring 42 toward its eccentric position, so that as the valve closes spool shoulder 32 cams the ring 42 into its concentric position against the resilient force of spring 51, and as the valve opens the force of spring 51 causes the ring 42 to ride back along shoulder 32 and thus to return to its eccentric position. The circular shape of ring 42, and its even thickness all around, have the effect of balancing the fluid pressures on its outer periphery against each other, since they are equal all around, and the same is true of the pressures on its inner periphery. Consequently, the spring 51 does not have to act against any substantial unbalanced fluid pressures, irrespective of what the pressure differential may be between ports 11 and 12.

A protective ring corresponding to the ring 42 could also be used in the port 41, but is not considered necessary in valve 10 as shown because the lower packing ring 29 passes the port 41 only when the spool 17 is being inserted or replaced, at which time there are not any fluid pressures on the valve tending to force the packing ring radially outwardly. In the case of a multi-way valve having one or more ports below port 41, an additional protective ring would be needed in port 41 and possibly in other of the ports as well.

While the ring 42 would be useful in protecting any form of packing which might become pinched in the ports, it is especially useful in cases where fluid or other pressures urge the packing radially outwardly from the spool axis, and is especially valuable in making it practicable to seal the spool with the improved form of packing rings exemplified by the packing ring 36 shown in Figures 1–6, and its modification shown in Figure 6A. Before the sealing ring 36 is inserted in the spool groove 35 it has the generally U-shaped cross section illustrated in Figure 6, with a thick rectangular outer portion 52, and an inner portion comprising a pair of spaced side walls 53 with a channel 54 therebetween. The sealing ring 36 is molded of suitable plastic material (resilient rubberlike material or a metallic composition, for example), and the walls 53 are normally curved outwardly so that when the sealing ring 36 is put in the groove 35 the channel 54 of the U-shaped cross-section faces the bottom of groove 35, and the walls 53 exert an initial outward sealing pressure against the side walls of groove 35. When fluid under pressure passes through passage 35a into channel 35 to fill the space behind packing ring 36, the pressure of fluid in channel 54 on the inner sides of the walls 53 plus the said initial pressure effectively opposes escape of fluid between the outer sides of the walls 53 and the opposite sides of groove 35, and the fluid pressure across the rear of packing ring 36 presses it radially outwardly into fluid-sealing engagement with the bore 25. As a result a good seal is obtained and the thick outer portions of the packing ring 36 prolong its life while the more flexible inner walls 53 operate in a protected space to make the sealing action more effective. For maximum effectiveness, the sealing ring 36 has a cylindrical outer face 55 against the bore 25, with a pair of small ridges 56 along the face 55 adjacent its side edges, with small channels 57 along the face 55 between the ridges 56, and with a semi-solid packing material which has lubricating characteristics (such as a graphite compound) filling the channels 57. The ridges 56 are effective in increasing unit pressure on the bore 25 for better sealing action, and tend to set up a sealed pocket between them. The material in channels 57 is protected by the ridges 56 and tends to deposit a film on the bore 25 as the spool 17 slides therealong, which film is partially picked up by the ridges 56 to augment their sealing action.

Another form of sealing ring 36' is shown in Figures 5A and 6A. It is the same in shape as the above-described ring 36 shown in the corresponding Figures 5 and 6 except that instead of being generally U-shaped in cross-section the ring 36' has an annular flange 36a extending radially inwardly from between its rear side walls 53'. A series of spaced openings 36b through the flange 36a permit fluid from the passage 30 to reach both sides of flange 36'. The innermost portion or base 36c of the flange 36a is adapted to extend around and abut the base of groove 26 of spool flange 24, in such manner that the flange 36a holds the outer surfaces of the ring 36' in position to engage the bore 25 with a least some initial pressure resulting from resilient compression of the ring 36' between bore 25 and the base of groove 26 (ring 36' causes the ridges 56 to project from groove 26 when the spool is out of the bore, as shown in Figure 5A). In this way the ring 36' is held in sealing position against bore 25 even when there is no fluid pressure against the back of the ring, so that sudden pressure changes do not catch the ring out of position and thus possibly prevent it from resuming its intended sealing action, and so that swelling of the ring after a period of use does not buckle it circumferentially when free of pressure against the back of the ring, with resultant destruction of the sealing action of the ring when high fluid pressure is subsequently applied. The ring 36' shown in Figures 5A and 6A has an integral flange 36a, but a U-shaped sealing ring such as the ring 36 in Figures 5 and 6 could be supported in the same manner by a corresponding separate flange of metal or other suitable material made to bear against the base of the channel around the inside of the sealing ring.

Another embodiment of the invention is the valve 59 illustrated in Figures 7–10, which has a protective ring 60 movable from eccentric position (Figures 7 and 8) to concentric position (Figures 9 and 10) by fluid pressure instead of by means such as the above-described spring 51. Valve 59 has inlet and outlet ports 61 and 62 corresponding to the ports 11 and 12 of valve 10 except that the flow cannot be reversed, and a case 63 corresponding to the case 13 of valve 10 except that the removable bonnet 64 of case 63 is ground off where it forms the upper annular surface 65 of the upper port 66 (corresponding to port 40) so that the surface 65 is at an acute angle to the opposite lower annular surface 67 of the port 66. The ring 60 has its upper and lower faces ground to the same acute angle to each other, and the spacing and angle between the port surfaces 65 and 67 is such that the ring 60 fits closely therebetween when the ring shifts into its concentric position while the valve is closed. The valve 59 has a bore 18 in its casing, a pin 69 anchoring the ring 60, and a valve spool 70, corresponding to the above-described bore 25, pin 47 and spool 17 of valve 10.

Figure 7:
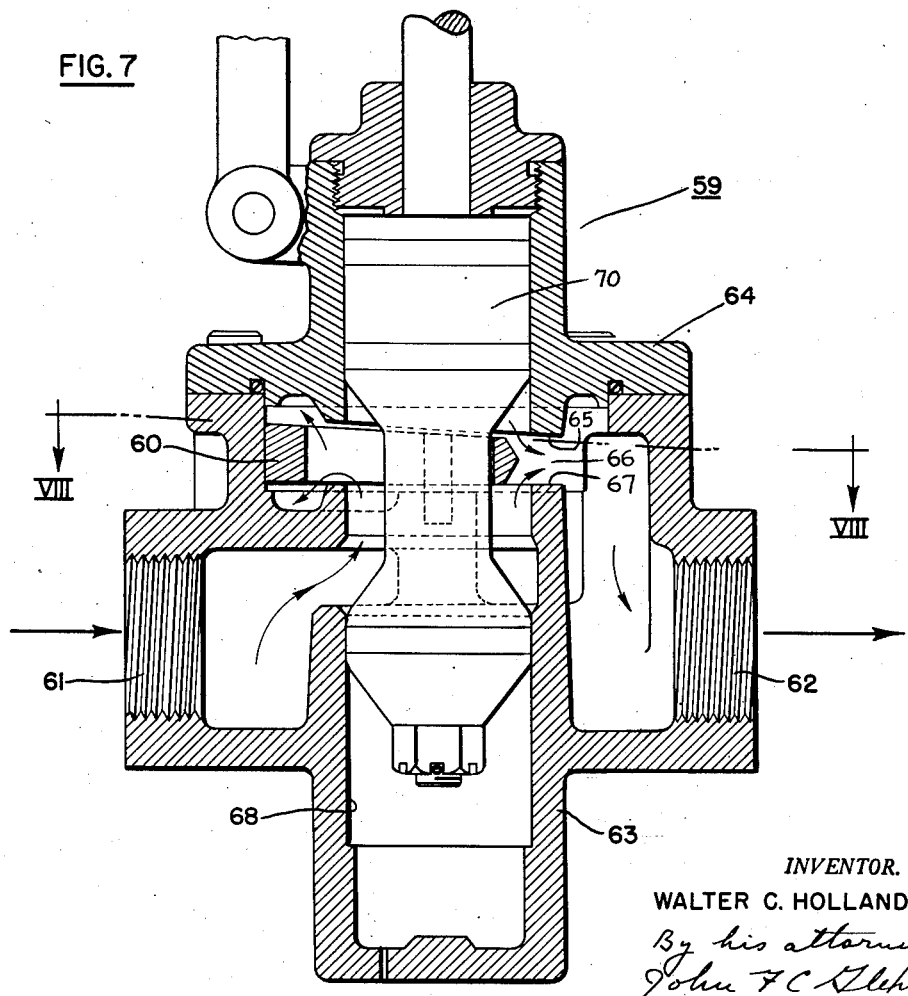
Figure 7 is a sectional view of another form of valve embodying the invention, with the valve spool in its upper (open) position.
Figure 13:
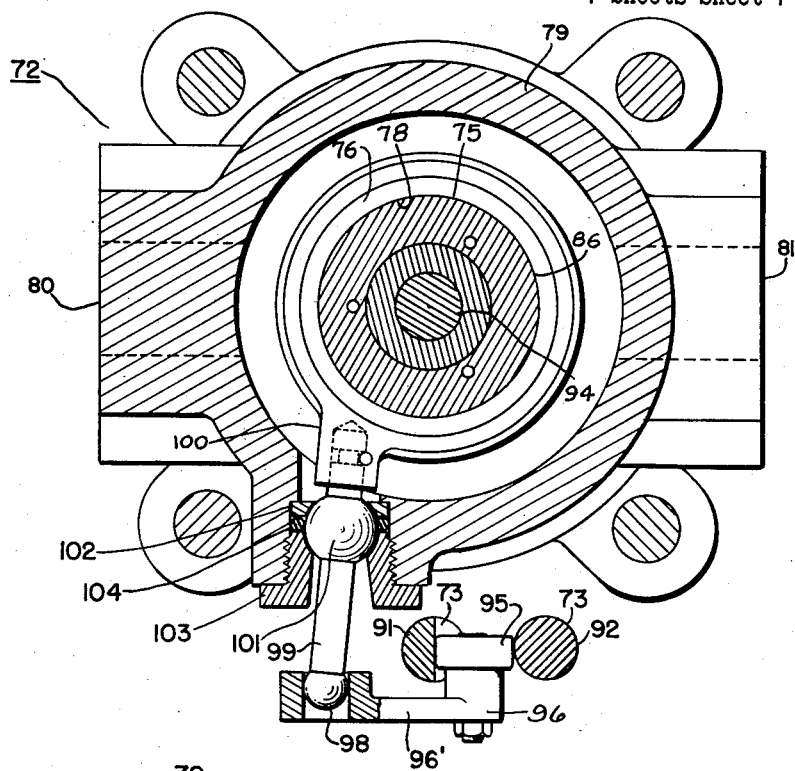
Figure 13 is an enlarged section on the line XIII—XIII in Figure 11, with the section passing through the upper valve flange (in port-closed position)
Figure 14:
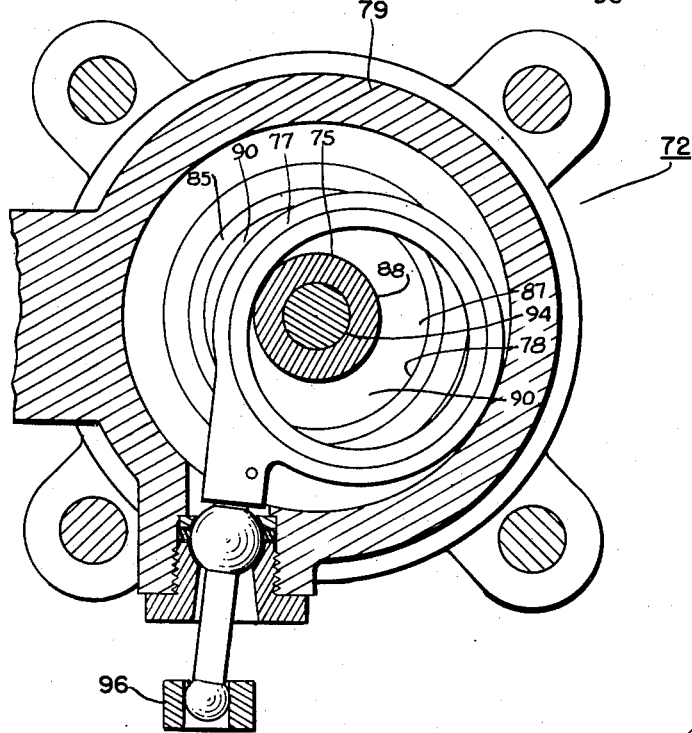
Figure 14 is an enlarged section on the line XIV—XIV in Figure 12 (figure rotated quarter-turn counter-clockwise), with the section passing through the lower valve flange (in port-open position).

The wedge shape of the protective ring 60 unbalances the fluid pressures around its periphery, so that the fluid pressure differential between the ports 61 and 62 tends to shift it sidewise. Fluid pressure from the inlet port 61 is greater all around the ring 60 than the opposite pressure from the outlet port 62, and the excess of inlet over outlet pressure acts against a larger area of the inner periphery on the thicker side of the ring to produce a net force biasing the ring away from its concentric seated position in port 66. Consequently, when the spool 70 (corresponding to spool 17) moves up to open the valve the ring 60 presses against the spool and moves out of port 66 into its eccentric position (Figure 8) as soon as it can slide down the shoulder of the spool flange to the slender portion of the spool (Figure 7). When the spool moves down again to close the valve its shoulder cams the ring 60 back into its concentric position (Figures 9 and 10) in the same manner as described above in regard to the spool 17 and ring 42 of valve 10, except that in the case of ring 60 the camming action is against unbalanced fluid pressure, the amount of which is proportional to the degree of wedge angle between the upper and lower faces of the ring. The protective action of ring 60 in regard to the sealing rings around the spool is the same as in the case of the protective ring 42 of valve 10.

A further embodiment of the invention is protective ring shifting system employed in the multi-way valve 72 shown in Figures 11-14. The valve 72 has a handle 74 which is linked to shift the valve spool 75 and also to shift a cam-track 73. The cam-track 73 moves a pair of protective rings 76 and 77 between their respective concentric and eccentric positions relative to the spool 75 and the bore 78 of the valve case 79. Three outer ports 80, 81 and 82 in case 79 are respectively connected to three inner ports 83, 84 and 85 which open into the bore 78. The inner ports 83 and 85 are shaped like the port 40 in Figures 1–4, and slidably receive the protective rings 76 and 77, respectively. The rings 76 and 77 have bore matching the valve bore 78, and have parallel flat top and bottom surfaces so that they are not urged sidewise by unbalanced fluid pressures. The spool 75 has a pair of valve flanges 86 and 87 at its opposite ends, and a middle portion 88 of reduced diameter therebetween. Each of the flanges 86 and 87 has a pair of spaced sealing rings 89 therearound corresponding to the sealing rings 36 and 38 shown in Figures 5 and 6, and has tapering shoulders 90 on each end thereof. The case 79 has two additional ports 80' and 82' which open into the opposite ends of bore 78 beyond the ends of spool 75.

When valve 72 is connected to operate a double-acting cylinder, for example, the port 80 is connected to one end of the cylinder, and the port 82 to the other end of the cylinder; the middle port 81 is connected to the outlet of a pump; and the outermost ports 80' and 82' are connected to the return lines of the reservoir tank connected to the pump inlet. With such connections, when the spool 75 is in its lowermost position (see spool position shown in full lines in Figure 12), the spool flange 86 blocks bore 78 between ports 83 and 84 and spool flange 87 blocks bore 78 between ports 85 and 82', and fluid under pressure pumped into outer port 81 passes through inner port 84 down bore 78 to inner port 85 and thence through outer port 82 to the cylinder. The resultant return flow from the other end of the cylinder enters outer port 80 and passes through inner port 83 up bore 78 through port 80' to the pump reservoir. When spool 75 is in its middle position (see Figures 11 and 13) the spool flange 86 extends across inner port 83 and the spool flange 87 extends across inner port 85, thereby shutting off flow through bore 78 between any of the ports. When spool 75 is in its uppermost position (see spool position shown in dotted lines in Figure 12), the spool flange 86 blocks bore 78 between ports 80' and 83 and the spool flange 87 blocks bore 78 between ports 84 and 85, and fluid under pressure pumped into outer port 81 passes through inner port 84 up bore 78 to inner port 83 and thence through outer port 80 to the cylinder. The resultant return flow from the other end of the cylinder enters outer port 82 and passes through inner port 85 down bore 78 through port 82' to the pump reservoir.

When spool 75 is in its uppermost position, and likewise when it is in its lowermost position, the protective rings 76 and 77 are both in their eccentric positions, to avoid blocking the inner ports 83 and 85 in which they are mounted, and when spool 75 is in its intermediate position the protective rings 76 and 77 are both concentric with the spool flanges 86 and 87, to protect the sealing rings 89 as they move back and forth past the respective inner ports 83 and 85 (the spool flanges 86 and 87 do not cross ports 80', 84 and 82' during the operating cycle, and hence protective rings are omitted in the latter ports). The means shown in Figures 11–14 for coordinating the movement of the protective rings 76 and 77 with the movement of spool 75 will now be described.

The cam track 73 is formed between two parallel bars 91 and 92 bolted at their upper ends to an arm of a member 93. The stem 94 of spool 75 is also fastened to member 93, and when handle 74 is operated to raise and lower member 93, cam track 73 and spool 75 are thereby moved in fixed relation to each other. A bracket 79a extends from case 79 to slide against bars 91 and 92 and support them against movement away from each other. A cam roller 95 in cam track 73 opposes movement of the bars 91 and 92 toward each other. Roller 95 is journaled on a sidearm 96' of a lever 96, which is pivoted on a pin 97 extending horizontally from case 79. The upper end of lever 96 has a socket receiving the semispherical end 98 of a lever pin 99 which extends at its other end into an opening in a side projection 100 from the protective ring 76. The middle portion of the lever pin 99 extends through and is fastened to a ball 101 journaled between an inner bearing ring 102 and an outer bearing sleeve 103 screwed into case 79, with an O-ring 104 therebetween to seal the joint around ball 101. A fluid-tight assembly is thus formed for transmitting leverage from the exterior to the interior of valve case 79. Lever pin 99 is fastened slightly loosely in ring projection 100 so that ring 76 is free to center itself accurately around flange 86 whenever the two pass into concentric relation. However, the shoulders 90 do not cam the ring 76 except for the said small final adjustment. Instead, when spool 75 starts to rise from its lowermost position (see Figure 12) a portion 73a of the cam track 73 (see Figure 11) soon begins to swing lever 96 and thus lever pin 99 to shift ring 76 from its eccentric to its concentric position slightly ahead of the time necessary for it to receive spool flange 86. The lever 96 stays in that position as the spool continues to rise and roller 95 passes along a straight intermediate portion 73b of the cam track. Then, slightly after spool flange 86 passes above ring 76, a portion 73b of the cam track swings lever 96 back to its first position and thereby shifts ring 76 back to its eccentric position, thus clearing inner port 83 for communication with inner port 84. The same happens in reverse during return movement of the spool.

The other protective ring 77 is connected to the lower end of lever 96 in the same way that ring 76 is connected to the upper end, and it operates in the same way with relation to spool flange 87 that ring 76 does in relation to flange 86, except that the ends of lever 96 move oppositely and hence the lever 96 reverses the direction of movement of rings 76 and 77 with respect to each other. However, both of the rings 76 and 77 move into their concentric positions at the same time, and out of them at the same time, and thus coordinate with movement of the flanges 86 and 87, which cross the respective inner ports 83 and 85 at the same time.

It will be observed that the ring-shifting means and other features of the invention are not limited to the forms of valves to which they are applied in the different groups of figures in the drawings, but may be interchanged among such valves and also applied to other forms of valves as well.

While I have illustrated and described present preferred embodiments of the invention, it will be recognized that the invention is not limited thereto but may be otherwise variously embodied and practiced within the scope of the following claims.

I claim:

1. A valve having a case with a bore therethrough, a valve element slidable in the bore, sealing means extending around the valve element and slidable along the bore, a fluid-conductive port opening transversely into the bore, and a member shiftable in the port toward and from the bore axis, said member having an opening therethrough adapted to form an extension of the bore across the port when the sealing means is moved across the port during opening and closing of the valve.

2. A valve having a case with a bore therethrough, a valve element slidable along the bore, a fluid-conductive port opening transversely into the bore, sealing means extending around the valve element and slidable along the bore across the port, and a member shiftable in the port toward and from the bore axis, said member having an opening therethrough which is adapted to form an extension of the bore across the port when the sealing means is moved across the port during opening and closing of the valve, and which is wider measured along the direction of movement of the valve element in the bore, than the corresponding width of the sealing means where it is engageable with the bore.

3. A valve having a case with a bore therethrough, a valve spool having a flange slidable in the bore, sealing means extending around the spool flange and slidable along the bore, a fluid-conductive port opening transversely into the bore, a member shiftable into and out of the port, said member having an opening therethrough adapted to be moved into concentric relation with the bore to form an extension of the bore across the port and thereby protect the sealing means as it is moved across the port during operation of the valve, and means to coordinate the movement of the valve flange and protective member.

4. A valve having a case with a bore therethrough, a fluid-conductive port opening transversely into the bore, a valve spool having a flange slidable along the bore across the port, sealing means mounted around the spool flange and slidable along the bore across the port, a member shiftable into and out of the port, said member having an opening therethrough adapted to be moved into concentric relation with the bore to form an extension of the bore across the port and thereby protect the sealing means as it is moved across the port during operation of the valve, and means to coordinate the movement of the valve flange and protective member, said means comprising a shoulder on the spool flange adapted to cam the said member into concentric position in the bore, and a spring connected to bias the member away from concentric position.

5. A valve having a case with a bore therethrough, a fluid-conductive port opening transversely into the bore, a valve spool having a flange slidable along the bore across the port, sealing means mounted around the spool flange and slidable along the bore across the port, a member shiftable into and out of the port, said member having an opening therethrough adapted to be moved into concentric relation with the bore to form an extension of the bore across the port and thereby protect the sealing means as it is moved across the port during operation of the valve, and means to coordinate the movement of the valve flange and protective member, said means comprising a shoulder on the spool flange adapted to cam the said member into concentric position in the bore, and opposite faces on said member which seat in the port and lie in convergent planes, so that the member is wedge-shaped and movable by fluid pressure away from concentric position in the bore.

6. A valve having a case with a bore therethrough, a fluid-conductive port opening transversely into the bore, a valve spool having a flange slidable along the bore across the port, sealing means mounted around the spool flange and slidable along the bore across the port, a member shiftable into and out of the port, said member having an opening therethrough adapted to be moved into concentric relation with the bore to form an extension of the bore across the port and thereby protect the sealing means as it is moved across the port during operation of the valve, and means to coordinate the movement of the valve flange and protective member, said means comprising a handle connected to shift the spool, and connections between the handle and said member whereby the handle is operable to shift the member to and from substantially concentric position.

7. A valve having a case with a bore therethrough, a valve spool slidable in the bore, sealing means extending around the valve spool and slidable along the bore, a fluid-conductive port opening transversely into the bore, a ring member shiftable into and out of the port toward and from the bore axis, said member having an opening therethrough adapted to form an extension of the bore across the port when the member is concentric with the bore, a handle connected to shift the spool, a cam track shiftably mounted on the valve case and connected to be shifted by said handle, and a cam follower operated by the cam track and connected to shift the ring member into substantially concentric relation with the bore when the sealing means is shifted across the port.

8. A valve having a case with a bore therethrough, a fluid-conductive port opening transversely into the bore, a valve spool slidable along the bore across the port, sealing means mounted around the valve spool and slidable along the bore across the port, a ring member shiftable into and out of the port toward and from the bore axis, said member having an opening therethrough adapted to form an extension of the bore across the port when the member is concentric with the bore, a handle connected to shift the spool, a cam track shiftably mounted on the valve case and connected to be shifted by said handle, a cam follower operated by the cam track, and means connecting the cam follower to shift the ring member into substantially concentric relation with the bore while the sealing means is shifted across the port, said means comprising a lever extending from the inside to the outside of the valve case, and including a spherical bearing member pivotally mounted in the case and supporting the lever, said bearing member having a sealing member extending therearound to prevent escape of fluid under pressure from the inside of the valve case.

9. A valve comprising a case with a bore therethrough, a valve spool having at least a pair of spaced annular flanges slidable in the bore, annular rubber-like sealing means extending around each flange and slidable along the bore, a plurality of fluid-conductive ports spaced axially along and opening transversely into the bore, a ring member mounted in each of at least two of said ports for movement into eccentric position permitting flow through the port and concentric position in which the opening in the ring forms an extension of the bore across the port to protect the said sealing means during its movement across the port, means connected to shift the spool, a cam track mounted outside of the valve case and connected to be moved by said spool operating means, a lever pivotally mounted on the valve case, means to rock the lever including a cam follower in said cam track, a separate lever connected to each of said ring-members and linked to said lever connected to the cam follower, means connected to shift both the spool and cam track and thereby to shift the ring members into and out of the ports in coordination with the movement of the valve flanges across said ports.

10. A valve comprising a case with a bore therethrough, a valve spool having an annular flange slidable in the bore, sealing means extending around the spool flange and slidable along the bore, said spool flange having an annular groove receiving said sealing means and a passage extending through the side of the spool flange to the base of said groove, a fluid-conductive port opening transversely into the bore, a member shiftable into and out of the port transversely of the bore axis, said member having an opening therethrough adapted to form an extension of the bore across the port when the sealing means is moved across the port during opening and closing of the valve, and means to shift the member in coordination with movement of the spool flange to position said opening eccentrically with respect to the bore when the valve flange is spaced from the port and concentrically with respect to the bore when the valve flange is crossing the port.

11. A valve comprising a case with a bore therethrough, a fluid-conductive port opening transversely into the bore, a valve spool having an annular flange slidable along the bore across the port, annular sealing means mounted around the spool flange and slidable along the bore across the port, said spool flange having an annular groove receiving said sealing means and a passage extending from the base of said groove through one side of the spool flange, a member shiftable into and out of the port transversely of the bore axis, said member having an opening therethrough adapted to form an extension of the bore across the port when the sealing means is moved across the port during opening and closing of the valve, and means to shift the member in coordination with movement of the spool flange to position said opening eccentrically with respect to the bore when the valve flange is spaced from the port and concentrically with respect to the bore when the valve flange is crossing the port, said sealing means having a generally U-shaped cross-section, with the open end of the U facing the base of the groove in which the sealing means is mounted, and the opposite end of the U in sealing engagement with the bore.

12. A valve comprising a case with a bore therethrough, a fluid-conductive port opening transversely into the bore, a valve spool having an annular flange slidable along the bore across the port, annular sealing means mounted around the spool flange and slidable along the bore across the port, said spool flange having an annular groove receiving said sealing means and a passage extending from the base of said groove through one side of the spool flange, a member shiftable into and out of the port transversely of the bore axis, said member having an opening therethrough adapted to form an extension of the bore across the port when the sealing means is moved across the port during opening and closing of the valve, and means to shift the member in coordination with movement of the spool flange to position said opening eccentrically with respect to the bore when the valve flange is spaced from the port and concentrically with respect to the bore when the valve flange is crossing the port, said sealing means having a cylindrical outer surface facing the bore with a pair of spaced annular ridges projecting from said surface and engaging the bore.

13. A valve comprising a case with a bore therethrough, a fluid-conductive port opening transversely into the bore, a valve spool having an annular flange slidable along the bore across the port, annular sealing means mounted around the spool flange and slidable along the bore across the port, said spool flange having an annular groove receiving said sealing means and a passage extending from the base of said groove through one side of the spool flange, a member shiftable into and out of the port transversely of the bore axis, said member having an opening therethrough adapted to form an extension of the bore across the port when the sealing means is moved across the port during opening and closing of the valve, and means to shift the member in coordination with movement of the spool flange to position said opening eccentrically with respect to the bore when the valve flange is spaced from the port and concentrically with respect to the bore when the valve flange is crossing the port, said sealing means having a solid component which has a cylindrical outer surface facing the bore, a pair of spaced annular ridges projecting from said surface and engaging the bore, and a groove between said ridges, and said sealing means also having as another component a semi-solid lubricating material in the groove between said ridges.

14. A valve comprising a case with a bore therethrough, a fluid-conductive port opening transversely into the bore, a valve spool having an annular flange slidable along the bore across the port, annular sealing means mounted around the spool flange and slidable along the bore across the port, said spool flange having an annular groove receiving said sealing means and a passage extending from the base of the groove through one side of the spool flange, a member shiftable into and out of the port transversely of the bore axis, said member having an opening therethrough adapted to form an extension of the bore across the port when the sealing means is moved across the port during opening and closing of the valve, and means to shift the member in coordination with movement of the spool flange to position said opening eccentrically with respect to the bore when the valve flange is spaced from the port and concentrically with respect to the bore when the valve flange is crossing the port, said sealing means having a generally T-shaped cross-section, with the leg of the T extending toward and engaging the base of the groove in which the sealing means is mounted, and with the head of the T in sealing engagement with the bore.

15. A valve comprising a case with a bore therethrough, a fluid conductive port opening transversely into the bore, a valve spool having an annular flange slidable along the bore across the port, annular sealing means extending around the spool flange and slidable along the bore across the port, said spool flange having an annular groove receiving said sealing means and a passage extending from the base of said groove through one side of the spool flange to the base of said groove, a member shiftable into and out of the port transversely of the bore axis, said member having an opening therethrough adapted to form an extension of the bore across the port when the sealing means is moved across the port during opening and closing of the valve, and means to shift the member in coordination with movement of the spool flange to position said opening eccentrically with respect to the bore when the valve flange is spaced from the port and concentrically with respect to the bore when the valve flange is crossing the port, said sealing means having a generally T-shaped cross-section, with the leg of the T extending toward and engaging the base of the groove in which the sealing means is mounted, and with the head of the T in sealing engagement with the bore, and said sealing means having openings through the annular flange formed by said leg of the T-shaped cross-section, whereby fluid pressure is equalized on opposite sides of said flange of the sealing means.

16. A valve comprising a valve case having a hollow interior for containing fluid under pressure, and having an opening extending through the case into said hollow interior, means to operate the valve including an operating lever extending through said opening, a pair of spaced metal members mounted in the opening and having semi-spherical concave seating surfaces cupped towards each other, a metal ball secured to the lever and pivotally seated against said seating surfaces, and a rubberlike O-ring extending around the ball in the space between said metal members to seal the said opening against escape of fluid under pressure from the interior of the valve case.

References Cited in the file of this patent

UNITED STATES PATENTS

| | | |
|---|---|---|
| 1,385,019 | Mathieu | July 19, 1921 |
| 2,393,076 | Van Der Werff | Jan. 15, 1946 |
| 2,486,246 | Beeke | Oct. 25, 1949 |
| 2,517,061 | Von Stackelberg | Aug. 1, 1950 |
| 2,650,455 | Jacobsson | Sept. 1, 1953 |
| 2,660,493 | Flick | Nov. 24, 1953 |
| 2,676,040 | Dalton | Apr. 20, 1954 |

FOREIGN PATENTS

| | | |
|---|---|---|
| 678,371 | France | 1929 |